United States Patent
Mao

(10) Patent No.: US 10,757,060 B2
(45) Date of Patent: Aug. 25, 2020

(54) MESSAGE NOTIFICATION METHOD AND TERMINAL

(71) Applicant: Huawei Technologies Co., Ltd., Shenzhen (CN)

(72) Inventor: Yanyan Mao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/489,565

(22) PCT Filed: Jun. 23, 2017

(86) PCT No.: PCT/CN2017/089752
§ 371 (c)(1),
(2) Date: Aug. 28, 2019

(87) PCT Pub. No.: WO2018/157519
PCT Pub. Date: Sep. 7, 2018

(65) Prior Publication Data
US 2020/0007488 A1  Jan. 2, 2020

(30) Foreign Application Priority Data

Feb. 28, 2017  (CN) .......................... 2017 1 0114940

(51) Int. Cl.
*H04W 4/12* (2009.01)
*H04L 12/58* (2006.01)
(Continued)

(52) U.S. Cl.
CPC ........ *H04L 51/24* (2013.01); *H04M 1/72552* (2013.01); *H04W 4/12* (2013.01); *H04W 68/005* (2013.01)

(58) Field of Classification Search
CPC ....................................................... H04L 51/24
(Continued)

(56) References Cited

U.S. PATENT DOCUMENTS 8,707,201 B1  4/2014  Aradhye et al.
2008/0275775 A1*  11/2008  Gonen ................... G06Q 30/02
705/14.71
(Continued)

FOREIGN PATENT DOCUMENTS

CN   102238097 A   11/2011
CN   103648084 A   3/2014
(Continued)

OTHER PUBLICATIONS

Machine Translation and Abstract of Chinese Publication No. CN103648084, Mar. 19, 2014, 13 pages.
(Continued)

*Primary Examiner* — Joel Ajayi
(74) *Attorney, Agent, or Firm* — Conley Rose, P.C.

(57) ABSTRACT

A message notification method includes obtaining, by a terminal, a plurality of notification messages, determining, by the terminal, a notification message with an ongoing attribute in the notification messages, sorting, by the terminal, the notification messages to obtain a notification message queue such that the notification message with an ongoing attribute is arranged in front of another notification message, and displaying, by the terminal, the notification message queue.

6 Claims, 13 Drawing Sheets

(51) Int. Cl.
*H04M 1/725* (2006.01)
*H04W 68/00* (2009.01)

(58) Field of Classification Search
USPC .................................................. 455/412.2
See application file for complete search history.

(56) References Cited

U.S. PATENT DOCUMENTS

| 2012/0198002 | A1 | 8/2012 | Goulart et al. |
| 2014/0297772 | A1* | 10/2014 | LoPorto ............ H04L 51/32 709/206 |
| 2017/0012919 | A1 | 1/2017 | Bryant |

FOREIGN PATENT DOCUMENTS

| CN | 104506715 A | 4/2015 |
| CN | 104796434 A | 7/2015 |
| CN | 105094814 A | 11/2015 |
| CN | 105245692 A | 1/2016 |
| CN | 105337847 A | 2/2016 |
| CN | 105898014 A | 8/2016 |
| CN | 106357890 A | 1/2017 |
| EP | 3096508 A1 | 11/2016 |
| WO | 2014000255 A1 | 1/2014 |
| WO | 2016143242 A1 | 9/2016 |

OTHER PUBLICATIONS

Machine Translation and Abstract of International Publication No. WO2014000255, Jan. 3, 2014, 38 pages.
Foreign Communication From a Counterpart Application, Chinese Application No. 201780014684.2, Chinese Office Action dated Oct. 21, 2019, 6 pages.
Foreign Communication From a Counterpart Application, European Application No. 17898725.1, Extended European Search Report dated Nov. 28, 2019, 7 pages.
Machine Translation and Abstract of Chinese Publication No. CN102238097, Nov. 9, 2011, 31 pages.
Machine Translation and Abstract of Chinese Publication No. CN104506715, Apr. 8, 2015, 26 pages.
Machine Translation and Abstract of Chinese Publication No. CN104796434, Jul. 22, 2015, 32 pages.
Machine Translation and Abstract of Chinese Publication No. CN105094814, Nov. 25, 2015, 30 pages.
Machine Translation and Abstract of Chinese Publication No. CN105245692, Jan. 13, 2016, 26 pages.
Machine Translation and Abstract of Chinese Publication No. CN105337847, Feb. 17, 2016, 26 pages.
Machine Translation and Abstract of Chinese Publication No. CN105898014, Aug. 24, 2016, 15 pages.
Machine Translation and Abstract of Chinese Publication No. CN106357890, Jan. 25, 2017, 9 pages.
Foreign Communication From a Counterpart Application, Chinese Application No. 201780014684.2, Chinese Office Action dated Apr. 19, 2019, 7 pages.
Foreign Communication From a Counterpart Application, PCT Application No. PCT/CN2017/089752, English Translation of International Search Report dated Oct. 27, 2017, 2 pages.
Foreign Communication From a Counterpart Application, PCT Application No. PCT/CN2017/089752, English Translation of Written Opinion dated Oct. 27, 2017, 5 pages.

* cited by examiner

MESSAGE NOTIFICATION METHOD AND TERMINAL

CROSS-REFERENCE TO RELATED APPLICATION

This application is a national stage application of International Application No. PCT/CN2017/089752, filed on Jun. 23, 2017, which claims priority to Chinese Patent Application No. 201710114940.7, filed on Feb. 28, 2017. Both of the aforementioned applications are hereby incorporated by reference in their entireties.

TECHNICAL FIELD

This application relates to the terminal application field, and in particular, to a message notification method and a terminal.

BACKGROUND

An existing smartphone generally has a message push function, to be specific, displays a system notification or a related notification of another application on a notification bar to remind a user to view the notification, for example, to notify the user that a new message is received on an instant messaging platform, or to notify the user that an application needs to be updated.

In the prior art, a rule for sorting notifications on a mobile phone is usually sorting the notifications based on time points at which the notifications are received.

In this case, when viewing the notifications, the user needs to view the notifications on the notification bar one by one to search for important information. Consequently, efficiency is low, and user experience is poor.

SUMMARY

Embodiments of this application provide a message notification method and a terminal, to facilitate searching of important information by a user, and improve user experience.

In view of this, a first aspect of this application provides a message notification method, where the method includes:

obtaining, by a terminal, a plurality of notification messages; determining a notification message with an ongoing attribute in the plurality of notification messages; then sorting the plurality of notification messages to obtain a notification message queue, where the notification message with an ongoing attribute is arranged in front of another notification message without an ongoing attribute in the notification message queue; and finally displaying, by the terminal, the notification message queue obtained through sorting.

It should be understood that, in this embodiment of this application, the ongoing attribute is used to indicate an ongoing notification, and is usually used to indicate a background task that a user actively participates in (for example, playing music) or is waiting for in a specific manner. An application service provider may assign, based on a requirement, an ongoing attribute to a notification message that requires continuous attention of the user.

In this embodiment of this application, after obtaining the plurality of notification messages, the terminal may determine the notification message with an ongoing attribute in the plurality of notification messages, then arrange the notification message with an ongoing attribute in front of another message, and display a sorting result. The notification message with an ongoing attribute is a message that is sent by a server corresponding to an application program and that requires continuous attention of the user. Generally, the message that requires continuous attention of the user, such as information received by instant messaging software, is information to which the user pays more attention. Therefore, the notification message with an ongoing attribute is arranged ahead, to facilitate searching of important information by the user, and improve user experience.

With reference to the first aspect of this application, in a first implementation of the first aspect of this application, the terminal may sort the plurality of notification messages in the following manner:

The terminal sorts notification messages with an ongoing attribute in ascending order of notification time points to obtain a first message queue, and sorts other notification messages without an ongoing attribute in ascending order of notification time points to obtain a second message queue, where the notification message queue includes the first message queue and the second message queue, and the first message queue is arranged in front of the second message queue.

It should be noted that the notification time point may be a time point at which the terminal receives the notification message, or may be a time point at which a transmit end sends the notification message.

This embodiment of this application provides a specific manner of sorting the notification messages, so that feasibility of this solution is improved.

With reference to the first aspect of this application, in a second implementation of the first aspect of this application, the terminal may sort the plurality of notification messages in the following manner:

The terminal sorts notification messages with an ongoing attribute in descending order of click-through rates corresponding to notification types, to obtain a first message queue; and sorts other notification messages without an ongoing attribute in descending order of click-through rates corresponding to notification types, to obtain a second message queue, where the notification message queue includes the first message queue and the second message queue, and the first message queue is arranged in front of the second message queue.

It should be understood that, the click-through rate corresponding to the notification type is a click-through rate corresponding to a notification type of a notification message. The terminal may first determine a notification type of each notification message, then determine a click-through rate corresponding to each notification type, and then sort the notification messages based on the click-through rates in the foregoing manner.

This embodiment of this application provides another specific manner of sorting the notification messages, thereby improving flexibility of this solution.

With reference to the first aspect of this application, in a third implementation of the first aspect of this application, the terminal may sort the plurality of notification messages in the following manner:

The terminal sorts notification messages with an ongoing attribute in descending order of click-through rates corresponding to notification types, to obtain a first message queue; and sorts other notification messages without an ongoing attribute in ascending order of notification time points to obtain a second message queue, where the notification message queue includes the first message queue and the second message queue, and the first message queue is arranged in front of the second message queue.

This embodiment of this application provides another specific manner of sorting the notification messages, thereby improving flexibility of this solution.

With reference to the first aspect of this application, in a third implementation of the first aspect of this application, the terminal may sort the plurality of notification messages in the following manner:

The terminal sorts notification messages with an ongoing attribute in ascending order of notification time points to obtain a first message queue, and sorts other notification messages without an ongoing attribute in descending order of click-through rates corresponding to notification types, to obtain a second message queue, where the notification message queue includes the first message queue and the second message queue, and the first message queue is arranged in front of the second message queue.

This embodiment of this application provides another specific manner of sorting the notification messages, thereby improving flexibility of this solution.

A second aspect of this application provides a message notification method, where the method includes:

obtaining, by a terminal, a plurality of notification messages; determining a notification type of each of the plurality of notification messages; then sorting the plurality of notification messages based on click-through rates corresponding to the notification types, to obtain a notification message queue; and finally displaying the notification message queue.

In this embodiment of this application, after obtaining the plurality of notification messages, the terminal may determine the notification types of the notification messages, then sort the notification messages based on the click-through rates corresponding to the types, and display a sorting result. In other words, in this embodiment of this application, a notification type in which a user is relatively interested may be identified based on historical behavior of the user, and then the notification type in which the user is interested is arranged ahead, to facilitate viewing of the user and improve search efficiency.

With reference to the second aspect of this application, in a first implementation of the second aspect of this application, the terminal may sort the plurality of communication messages based on the click-through rates in the following manner:

The terminal sorts, in ascending order of notification time points, notification messages whose click-through rates are greater than a preset threshold, to obtain a first message queue; and sorts, in ascending order of notification time points, notification messages whose click-through rates are less than the preset threshold, to obtain a second message queue, where the notification message queue includes the first message queue and the second message queue, and the first message queue is arranged in front of the second message queue in the notification message queue.

It should be understood that, the notification time point may be a time point at which the notification message is received, or may be a time point at which the notification message is sent.

This embodiment of this application provides a specific manner of sorting the notification messages, so that feasibility of this solution is improved.

With reference to the second aspect or the first implementation of the second aspect of this application, in a second implementation of the second aspect of this application, before obtaining the plurality of notification messages, the terminal may perform the following step:

determining, based on a notification message displayed within a preset time period and a notification message clicked by a user within the preset time period, a click-through rate corresponding to each notification type.

This embodiment of this application provides a specific manner in which the terminal calculates the click-through rate, so that feasibility of this solution is improved.

With reference to the second aspect or the first or the second implementation of the second aspect of this application, in a third implementation of the second aspect of this application, the terminal may determine the notification type of the notification message in the following manner:

The terminal determines the notification type of each notification message based on an application type corresponding to the notification message and a message type corresponding to the notification message, where the application type is a type of an application to which the notification message belongs, and the message type is a type of the notification message.

This embodiment of this application provides a specific manner of determining the notification type, so that feasibility of this solution is improved.

A third aspect of this application provides a terminal, where the terminal includes:

an obtaining module, configured to obtain a plurality of notification messages;

a determining module, configured to determine a notification message with an ongoing ongoing attribute in the plurality of notification messages obtained by the obtaining module;

a sorting module, configured to sort the plurality of notification messages to obtain a notification message queue, so that the notification message with an ongoing attribute is arranged in front of another notification message; and a display module, configured to display the notification message queue.

With reference to the third aspect of this application, in a first implementation of the third aspect of this application, the sorting module includes:

a first sorting unit, configured to: sort notification messages with an ongoing attribute in ascending order of notification time points to obtain a first message queue, and sort other notification messages in ascending order of notification time points to obtain a second message queue, where the notification message queue includes the first message queue and the second message queue, and the first message queue is arranged in front of the second message queue.

With reference to the third aspect of this application, in a second implementation of the third aspect of this application, the sorting module includes:

a second sorting unit, configured to: sort notification messages with an ongoing attribute in descending order of click-through rates corresponding to notification types, to obtain a first message queue; and sort other notification messages in descending order of click-through rates corresponding to notification types, to obtain a second message queue, where the notification message queue includes the first message queue and the second message queue, and the first message queue is arranged in front of the second message queue.

With reference to the third aspect of this application, in a third implementation of the third aspect of this application, the sorting module includes:

a third sorting unit, configured to: sort notification messages with an ongoing attribute in descending order of click-through rates corresponding to notification types, to obtain a first message queue; and sort other notification messages in ascending order of notification time points to obtain a second message queue, where the notification message queue includes the first message queue and the second message queue, and the first message queue is arranged in front of the second message queue.

A fourth aspect of this application provides a terminal, where the terminal includes:

an obtaining module, configured to obtain a plurality of notification messages;

a first determining module, configured to determine a notification type of each of the plurality of notification messages obtained by the obtaining module;

a sorting module, configured to sort the plurality of notification messages based on click-through rates corresponding to the notification types determined by the first determining module, to obtain a notification message queue; and a display module, configured to display the notification message queue.

With reference to the fourth aspect of this application, in a first implementation of the fourth aspect of this application, the sorting module includes:

a sorting unit, configured to: sort, in ascending order of notification time points, notification messages whose click-through rates are greater than a preset threshold, to obtain a first message queue; and sort, for the terminal in ascending order of notification time points, notification messages whose click-through rates are less than the preset threshold, to obtain a second message queue, where the notification message queue includes the first message queue and the second message queue, and the first message queue is arranged in front of the second message queue.

With reference to the fourth aspect or the first implementation of the fourth aspect of this application, in a second implementation of the fourth aspect of this application, the terminal may further include:

a second determining module, configured to determine, based on a notification message displayed within a preset time period and a notification message clicked by a user within the preset time period, a click-through rate corresponding to each notification type.

With reference to the fourth aspect or the first or the second implementation of the fourth aspect of this application, in a third implementation of the fourth aspect of this application, a first determining unit is configured to determine the notification type of each notification message based on an application type corresponding to the notification message and a message type corresponding to the notification message, where the application type is a type of an application to which the notification message belongs, and the message type is a type of the notification message.

A fifth aspect of this application provides a terminal, where the terminal includes an input device, an output device, a memory, and a processor, where the memory is configured to store a program; and
the processor is configured to execute the program that specifically includes the following steps:

obtaining a plurality of notification messages;
determining a notification message with an ongoing ongoing attribute in the plurality of notification messages;

sorting the plurality of notification messages to obtain a notification message queue, so that the notification message with an ongoing attribute is arranged in front of another notification message, and displaying the notification message queue.

A sixth aspect of this application provides a terminal, where the terminal includes an input device, an output device, a memory, and a processor, where the memory is configured to store a program; and
the processor is configured to execute the program that specifically includes the following steps:

obtaining a plurality of notification messages;
determining a notification type of each of the plurality of notification messages;

sorting the plurality of notification messages based on click-through rates corresponding to the notification types, to obtain a notification message queue; and displaying the notification message queue.

A seventh aspect of this application provides a computer-readable storage medium, including an instruction, where when the instruction runs on a computer, the computer executes the methods according to the foregoing aspects.

An eighth aspect of this application provides a computer program product, where when the computer program product runs on a computer, the computer executes the methods according to the foregoing aspects.

It can be learned from the foregoing technical solutions that the embodiments of this application have the following advantages:

In the embodiments of this application, after obtaining the plurality of notification messages, the terminal may determine the notification message with an ongoing attribute in the plurality of notification messages, then arrange the notification message with an ongoing attribute in front of another message, and display a sorting result. The notification message with an ongoing attribute is a message that is sent by a server corresponding to an application program and that requires continuous attention of the user. Generally, the message that requires continuous attention of the user, such as information received by instant messaging software, is information to which the user pays more attention. Therefore, the notification message with an ongoing attribute is arranged ahead, to facilitate searching of important information by the user, and improve user experience.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application.

DESCRIPTION OF EMBODIMENTS

Figure 1:
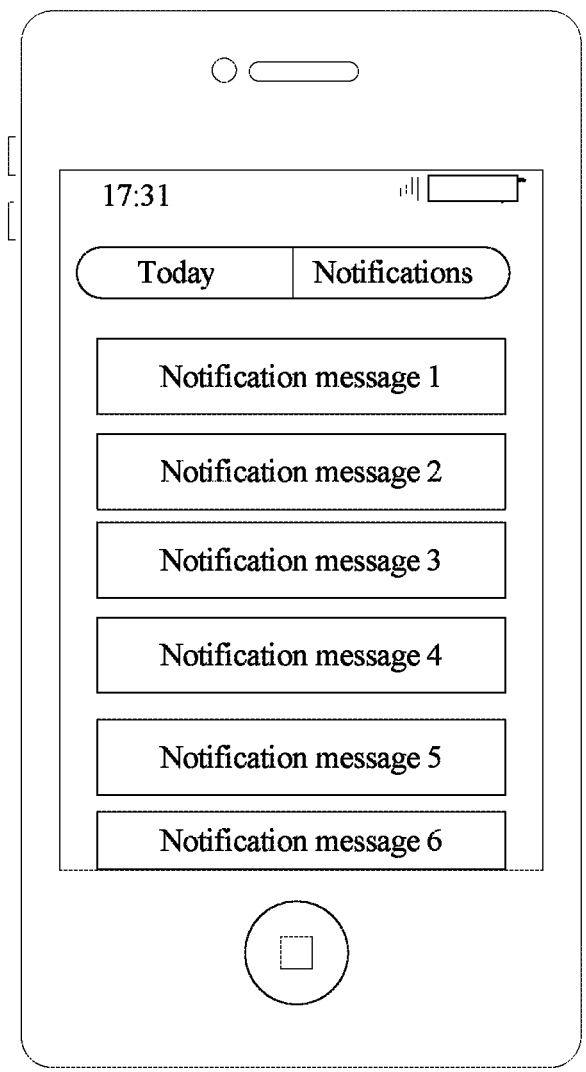
FIG. 1 is a schematic diagram of an application scenario to which a message notification method according to an embodiment of this application is applicable.

The following clearly describes the technical solutions in the embodiments of this application with reference to the accompanying drawings in the embodiments of this application. Apparently, the described embodiments are merely some but not all of the embodiments of this application.

In the specification, claims, and accompanying drawings of this application, the terms "first", "second", "third", "fourth", and the like (if existent) are intended to distinguish between similar objects but do not necessarily indicate a specific order or sequence. It should be understood that, the term used in such a way are interchangeable in proper circumstances, so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units that are not expressly listed or inherent to such a process, method, product, or device.

The embodiments of this application provide a message notification method, to facilitate searching of important information by a user, and improve user experience.

To facilitate understanding of the embodiments of this application, the following first describes some terms in the embodiments of this application.

Notification message: Only one application program can be in an active state at any time in most terminals. If an event in which a user is interested occurs in another application at this moment, a notification message is sent by using a notification mechanism, to notify the user of the event that occurs at this moment. The notification message in the embodiments of this application includes a local notification and a push notification. The local notification is triggered by a local application, and is a notification form that is based on time behavior. For example, an alarm clock, a to-do list reminder, and a notification usually used to prompt a user to use an application after the application is not used for a time period are local notifications. The push notification is a notification sent by an application service provider to an application client, for example, an application update reminder.

Ongoing (ongoing) attribute: The ongoing attribute is used to indicate an ongoing notification, and is usually used to indicate a background task that a user actively participates in (for example, playing music) or is waiting for in a specific manner. An application service provider may assign, based on a requirement, an ongoing attribute to a notification message that requires continuous attention of the user.

Click-through rate: A click-through rate corresponding to a notification type in the embodiments of this application is a ratio of a quantity of times of clicking a type of notification message to a quantity of times of displaying the notification message.

For ease of understanding, the following describes an application scenario to which the message notification method in the embodiments of this application is applicable.

The message notification method in the embodiments of this application is applied to a terminal. The terminal may include but is not limited to an electronic device such as a mobile phone, a tablet computer, and a portable computer. A plurality of application clients are installed on the terminal. The application clients may be application clients (for example, a system tool, a calendar, and an address book) preinstalled in a terminal system (for example, an Android system, iOS, or Windows Phone) before the terminal is delivered from a factory, or may be autonomously installed by the user in a memory of the terminal or in an expansion card of the terminal. This is not limited in the embodiments of this application.

After the terminal is started, different notification messages are received at different time points by using the application clients. The terminal displays the notification messages in different forms and methods based on a preset notification mechanism. Specifically, as shown in FIG. 1, when the user opens a notification bar display interface, the terminal displays notification messages that have not been browsed. The notification messages are sorted in a specific order to form a notification message queue.

Figure 2:
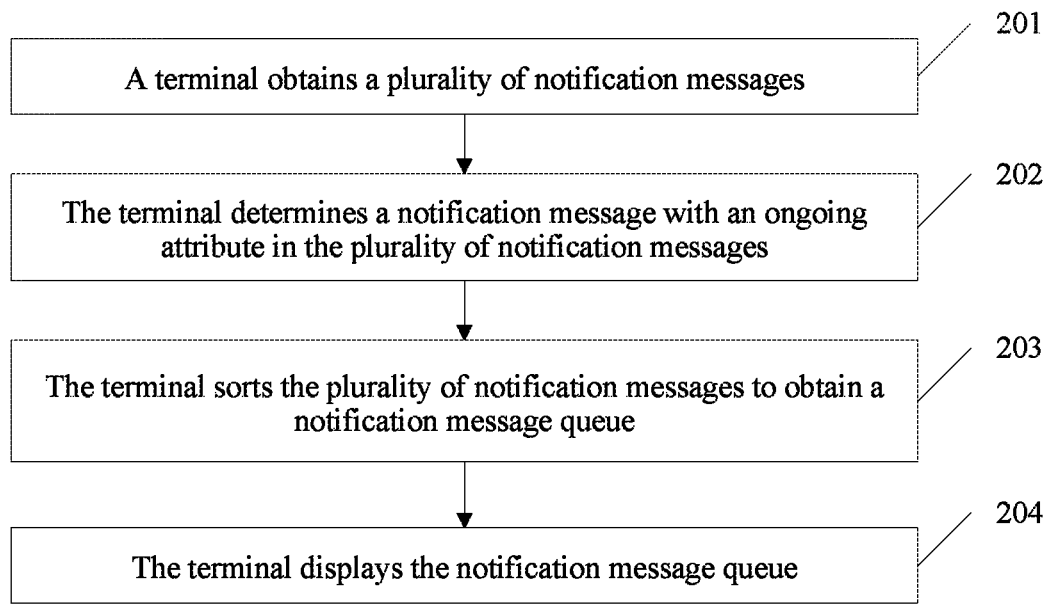
FIG. 2 is a flowchart of an embodiment of a message notification method according to an embodiment of this application.

The following first describes a message notification method in an embodiment of this application. Referring to FIG. 2, an embodiment of the message notification method in this embodiment of this application includes the following steps.

201: A terminal obtains a plurality of notification messages.

In this embodiment of this application, a plurality of application clients are installed on the terminal. After the terminal is started, the terminal may trigger generation of a notification message based on a local application, for example, a to-do list reminder notification. Alternatively, the terminal may receive, by using an application client, a notification message sent by an application server, for example, an application update reminder. Alternatively, the terminal may obtain a notification message in another manner. This is not specifically limited herein.

Figure 3:
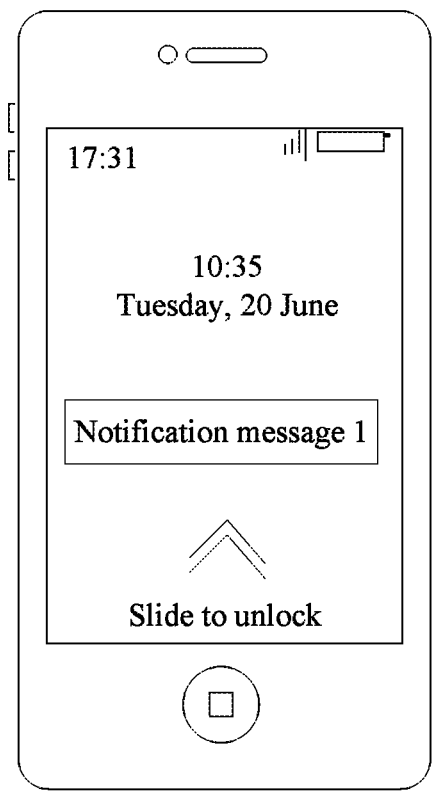
FIG. 3 is a schematic diagram of a notification message displayed on a terminal according to an embodiment of this application.
Figure 4:
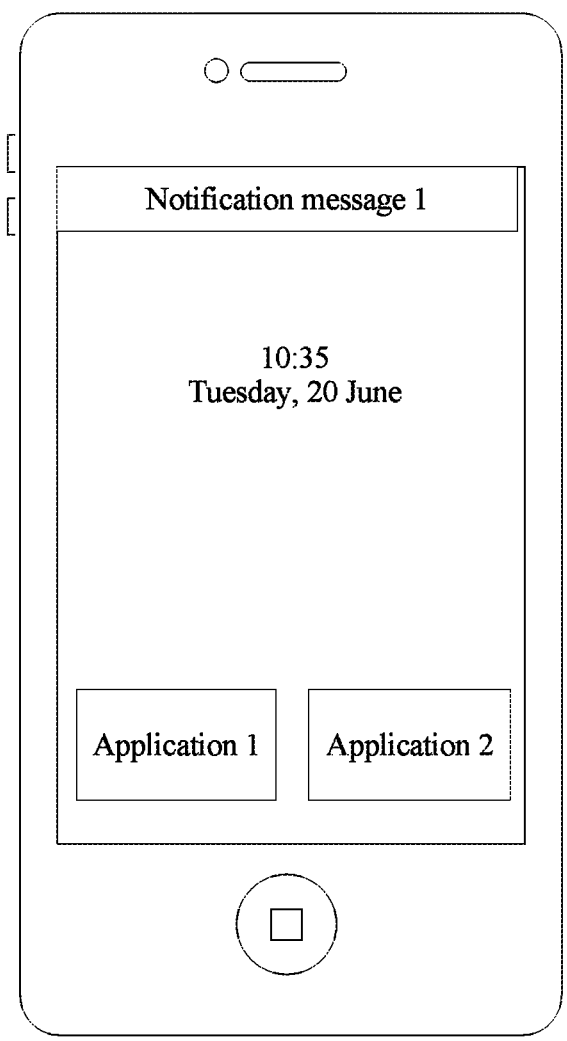
FIG. 4 is another schematic diagram of a notification message displayed on a terminal according to an embodiment of this application.

After obtaining the notification message, the terminal may instantly display the notification message, to send a reminder to a user. As shown in FIG. 3, FIG. 3 is a schematic diagram in which the terminal displays an obtained notification message when the terminal is in a standby state. As shown in FIG. 4, FIG. 4 is a schematic diagram in which the terminal displays an obtained notification message when the terminal is in an active state. Alternatively, the terminal may instantly display an obtained notification message in another manner, or may not display an obtained notification message. This is not specifically limited herein.

In this case, in this embodiment of this application, the plurality of notification messages obtained by the terminal may include a notification message that is not displayed, a notification message that is displayed but is not viewed by the user, or a notification message that is viewed but is not processed by the user, and may further include another notification message that needs to be displayed in a message queue. This is not specifically limited herein.

202: The terminal determines a notification message with an ongoing attribute in the plurality of notification messages.

After obtaining the plurality of notification messages, the terminal first determines the notification message with an ongoing attribute in the plurality of notification messages.

It should be understood that, in this embodiment of this application, the ongoing attribute is used to indicate an ongoing notification, and the attribute is preset by the application server for different types of notifications. Generally, the application server assigns an ongoing attribute to a notification that requires continuous attention of the user, for example, a message received in an instant messaging application.

203: The terminal sorts the plurality of notification messages to obtain a notification message queue.

After the terminal determines the notification message with an ongoing attribute in the plurality of notification messages, the terminal extracts the notification message with an ongoing attribute, and preferably displays the notification message with an ongoing attribute. To be specific, the terminal arranges the notification message with an ongoing attribute in front of another notification message without an ongoing attribute.

204: The terminal displays the notification message queue.

Figure 5:
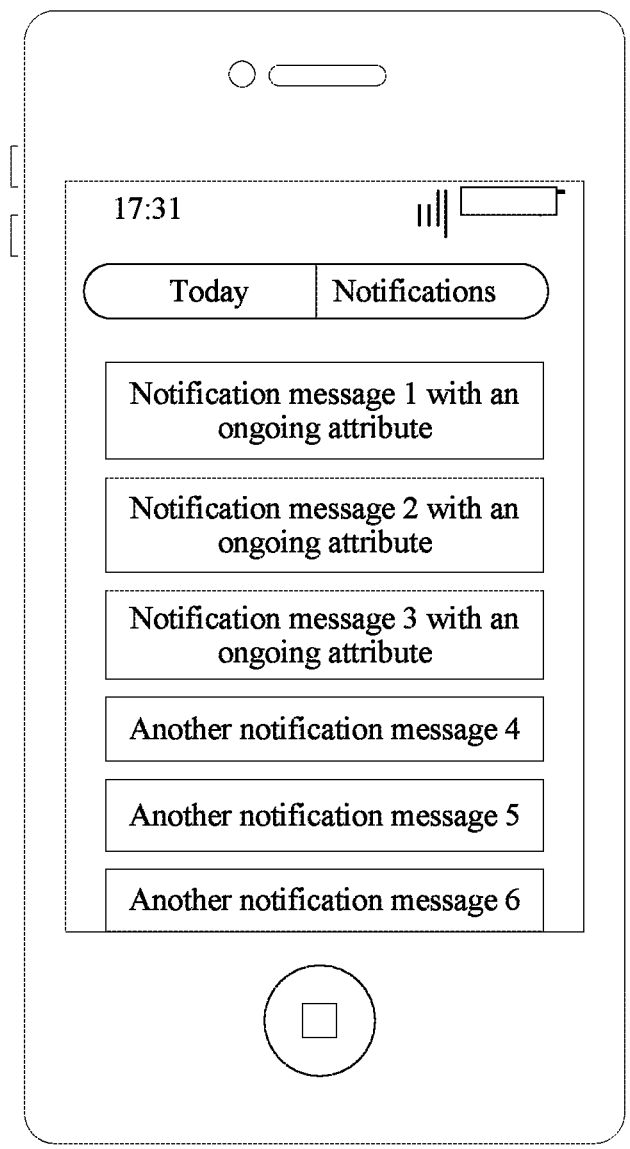
FIG. 5 is a schematic diagram of a notification message queue displayed on a terminal according to an embodiment of this application.
Figure 6:
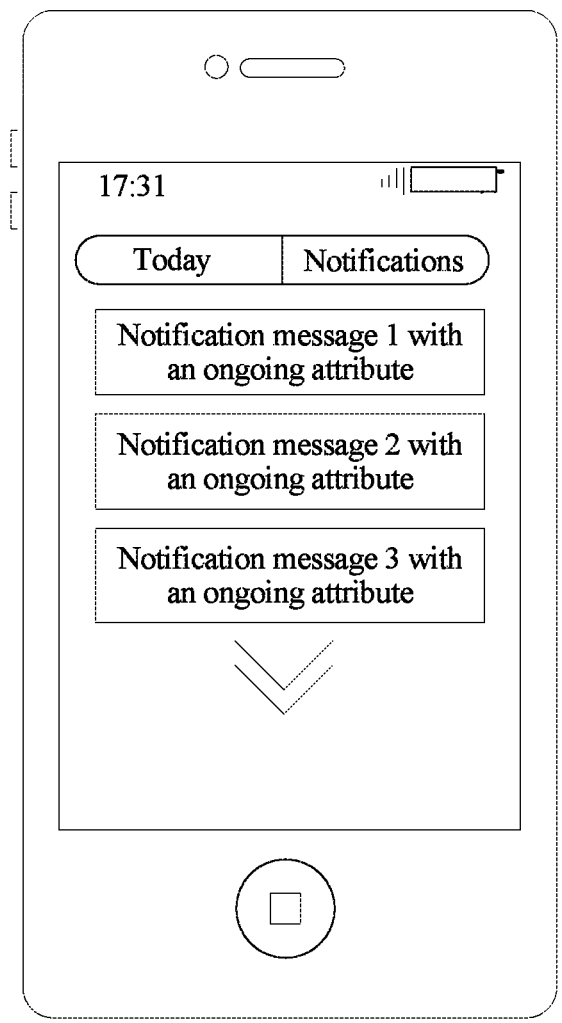
FIG. 6 is another schematic diagram of a notification message queue displayed on a terminal according to an embodiment of this application.

After sorting the plurality of notification messages to obtain the notification message queue, the terminal displays the notification message queue. Specifically, in this embodiment of this application, the terminal may display the notification messages in the notification message queue in the manner shown in FIG. 3, or may display the notification messages in the notification message queue in the manner shown in FIG. 4, or as shown in FIG. 5, may display the notification messages in the notification message queue in a centralized manner in a notification message queue display interface. It should be understood that in actual application, a manner of displaying the notification message queue in the notification message queue display interface is not limited to the manner in FIG. 5. For example, the terminal may display only one or more notification messages in the notification message queue, and thumbnail or hide another notification message. As shown in FIG. 6, the thumbnailed or hidden notification message is displayed only when a user-related operation instruction is received. It should be further understood that, in this embodiment of this application, the notification message queue display interface may be a notification bar display interface of the terminal, or may be another message display interface. This is not specifically limited herein.

In this embodiment of this application, after obtaining the plurality of notification messages, the terminal may determine the notification message with an ongoing attribute in the plurality of notification messages, then arrange the notification message with an ongoing attribute in front of another message, and display a sorting result. The notification message with an ongoing attribute is a message that is sent by a server corresponding to an application program and that requires continuous attention of the user. Generally, the message that requires continuous attention of the user, such as information received by instant messaging software, is information to which the user pays more attention. Therefore, the notification message with an ongoing attribute is arranged ahead, to facilitate searching of important information by the user, and improve user experience.

Based on the embodiment corresponding to FIG. 2, it can be learned that the terminal may sort the plurality of notification messages in a plurality of manners to obtain the notification message queue. The following describes in detail several manners.

1. Sorting is Performed Based on a Time Point.

In this embodiment of this application, after the terminal determines the notification message with an ongoing attribute in the plurality of notification messages, the terminal extracts the notification message with an ongoing attribute; sorts notification messages with an ongoing attribute in ascending order of notification time points to obtain a first message queue; and then similarly, sorts other notification messages without an ongoing attribute in ascending order of notification time points to obtain a second message queue. The notification message queue is a message queue that includes the first message queue and the second message queue, and the first message queue is arranged in front of the second message queue.

It should be understood that, the notification time point in this embodiment of this application may be a time point at which the notification message is received, or may be a time point at which the notification message is sent. This is not specifically limited herein.

To facilitate understanding of this embodiment of this application, the following describes the message notification method in this embodiment of this application by using an actual application scenario.

Figure 7:
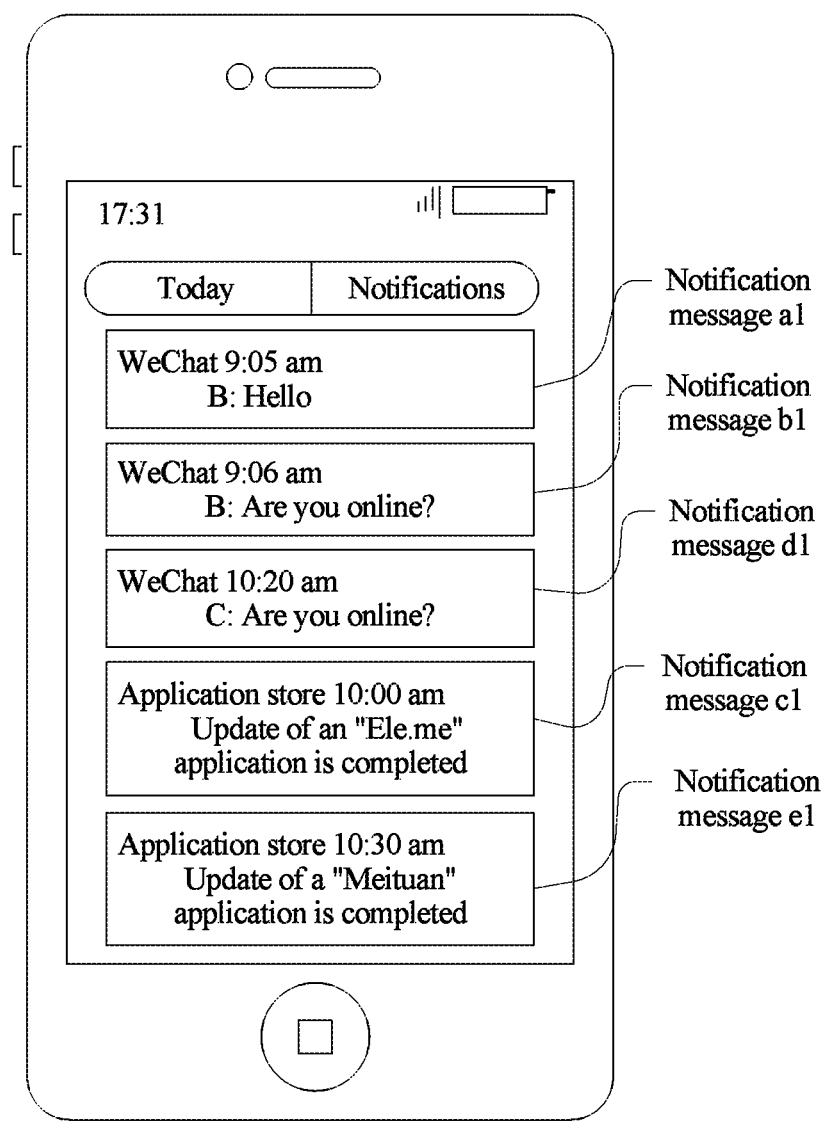
FIG. 7 is another schematic diagram of a notification message queue displayed on a terminal according to an embodiment of this application.

Application scenario (1): The user starts the terminal, and a WeChat application and an application software store run the terminal in a background. A WeChat account A of the user is logged in to in the WeChat application. At 9:05 am, the WeChat account A receives information "Hello" sent by a WeChat account B, and a WeChat application server sends a notification message a1 to the terminal by using the WeChat application, to remind the user to view the notification message. At 9:06 am, the WeChat account A further receives information "Are you online?" sent by the WeChat account B, and the WeChat application server sends a notification message b1 to the terminal by using the WeChat application, to remind the user to view the notification message. At 10:00 am, the application software store automatically updates an Ele.me application on the terminal in the background based on settings, and an application software store server sends a notification message c1 to the terminal to remind the user that the update is completed. At 10:20 am, the WeChat account A receives information "OK" sent by a WeChat account C, and the WeChat application server sends a notification message d1 to the terminal by using the WeChat application, to remind the user to view the notification message. At 10:30 am, the application software store automatically updates a Meituan application on the terminal in the background based on settings, and the application software store server sends a notification message e to the terminal to remind the user that the update is completed. The terminal obtains the notification messages a1, b1, c1, d1, and e1, and then determines that the notification messages a1, b1, and d1 in the five notification messages are notification messages with an ongoing attribute. The terminal sorts the messages a1, b1, and d1 in an order of receiving time points to obtain a first message queue (a1-b1-d1), sorts the messages c1 and e1 in an order of receiving time points to obtain a second message queue (c1-e1), and arranges the first message queue in front of the second message queue to obtain a notification message queue. Specifically, as shown in FIG. 7, after the user opens the terminal to display the notification bar display interface of the terminal, the terminal displays the notification message queue in the notification bar display interface.

2. Sorting is Performed Based on a Click-Through Rate.

In this embodiment of this application, after obtaining the notification messages, the terminal determines notification types of the notification messages, then determines click-through rates corresponding to the notification types in the terminal, and then sorts the plurality of notification messages based on the click-through rates. Specifically, the terminal may sort notification messages with an ongoing attribute in descending order of click-through rates corresponding to notification types, to obtain a first message queue; and similarly, sort other notification messages without an ongoing attribute in descending order of click-through rates corresponding to notification types, to obtain a second message queue. The notification message queue is a message queue that includes the first message queue and the second message queue, and the first message queue is arranged in front of the second message queue.

Optionally, in this embodiment of this application, the terminal may sort, in ascending order of notification time points, notification messages that are of a same notification type and with an ongoing attribute. Similarly, the terminal may also sort, in ascending order of notification time points, notification messages that are of a same notification type and without an ongoing attribute.

It should be understood that, in this embodiment of this application, a notification type of a notification message may be determined based on an application type of the notification message, or may be determined based on a message type of the notification message, or may be determined in a combination of an application type of the notification message and a message type of the notification message. The application type is a type of an application to which the notification message belongs, and the message type is a type of the message. In addition to the foregoing manner, the terminal may determine the notification type in another manner. This is not specifically limited herein.

Specifically, the terminal may determine the notification type of the notification message in a combination of the application type of the notification message and the message type of the notification message in the following manner: The terminal presets a first weight corresponding to the type (the application type) of the application and a second weight corresponding to the type (the message type) of the message; then analyzes a tendency degree of each type corresponding to the application to which the notification message belongs and a tendency degree of each type corresponding to message content of the notification message; then calculates, based on the first weight and the second weight, a weighted average corresponding to each type; and then uses a type with a largest weighted average as the notification type of the notification message.

To facilitate understanding of the foregoing determining manner, the following describes the calculation process by using an actual scenario.

Application scenario (2): The terminal presets the first weight corresponding to the application type to 40%, and presets the second weight corresponding to the message type to 60%. The terminal obtains a notification message sent by a WeChat application server, and the notification message is a push notification of financial news. In this case, the terminal analyzes a tendency degree of each type corresponding to an application (a WeChat application) to which the notification message belongs, and an analysis result is: social communication 100% and entertainment 10%. In addition, the terminal analyzes a tendency degree of each type corresponding to the application to which the notification message belongs, and an analysis result is: financial stocks 80% and news 90%. In this case, the terminal calculates a weighted average corresponding to each type, as shown in the following Table 1:

TABLE 1

| Type | Weighted average |
| --- | --- |
| Social communication | 100% × 40% = 0.4 |
| Entertainment | 10% × 40% = 0.04 |
| Financial stocks | 80% × 60% = 0.48 |
| News | 90% × 60% = 0.54 |

It can be learned from the calculation result shown in Table 1 that the weighted average of the news type is the largest. In this case, the terminal may determine that a notification type of the notification message is the news type.

It should be further understood that, in this embodiment of this application, before sorting the notification messages, the terminal may obtain, through calculation based on a quantity of times of displaying a notification message of each notification type and a quantity of times of clicking the notification message of each notification type, a click-through rate corresponding to the notification message of each notification type. Specifically, the terminal may determine, through statistics collection, a quantity of times of displaying the notification message of each notification type within a preset time period, and a quantity of times of clicking the notification message of the notification type within the preset time period; and then divide, by the quantity of times of displaying the notification message, the quantity of times of clicking the notification message, to obtain the click-through rate corresponding to the notification message of the notification type.

To facilitate understanding of this embodiment of this application, the following describes the message notification method in this embodiment of this application by using an actual application scenario.

Application scenario (3): The user starts the terminal, and a WeChat application, a Kugou application, and an application software store run the terminal in a background. A WeChat account A of the user is logged in to the WeChat application, and the Kugou application is playing a song in a playlist. At 9:00 am, playing of the song in the playlist is completed, and a Kugou application server sends a notification message a2 to the terminal to remind the user that playing of the song is completed. At 9:05 am, the WeChat account A receives information "Hello" sent by a WeChat account B, and a WeChat application server sends a notification message b2 to the terminal by using the WeChat application, to remind the user to view the notification message. At 10:30 am, the application software store automatically updates a Meituan application on the terminal in the background based on settings, and an application software store server sends a notification message c2 to the terminal to remind the user that the update is completed. At 10:45 am, the WeChat application server sends a push notification (a notification message d2) of sports news to the terminal.

The terminal obtains the notification messages a2, b2, c2, and d2; then determines that the notification messages a2 and b2 in the four notification messages are notification messages with an ongoing attribute, and the notification messages c2 and d2 are notification messages without an ongoing attribute; and determines that a notification type of the notification message a2 is a music type, a notification type of the notification message b2 is a social communication type, a notification type of the notification message c2 is a life type, and a notification type of the notification message d2 is a sports type.

The terminal obtains, in advance through calculation based on a quantity of times of displaying a notification message of each notification type and a quantity of times of clicking the notification message of each notification type, a click-through rate corresponding to the notification message of each notification type. A click-through rate corresponding to the social communication type is 95%, a click-through rate corresponding to the music type is 60%, a click-through rate corresponding to the life type is 50%, and a click-through rate corresponding to the sports type is 70%.

Figure 8:
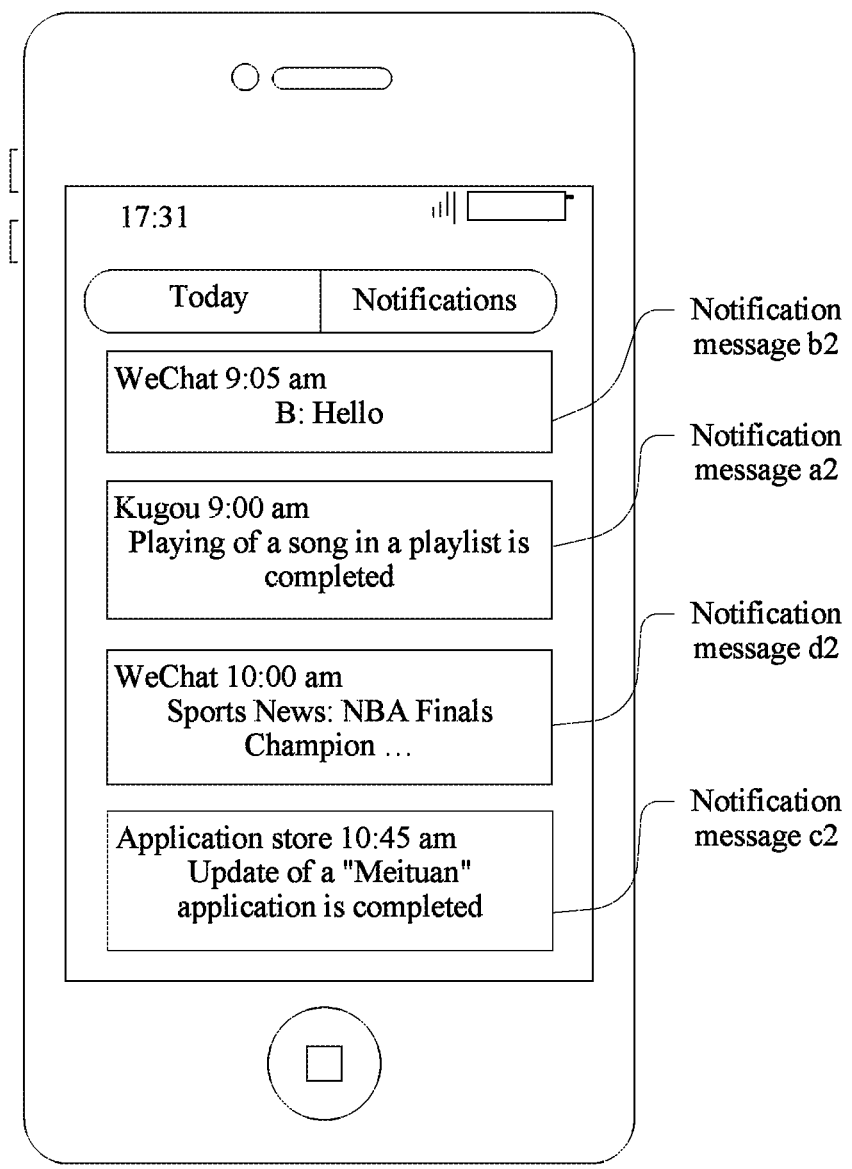
FIG. 8 is another schematic diagram of a notification message queue displayed on a terminal according to an embodiment of this application.

In this case, the terminal sorts the notification messages a2 and b2 with an ongoing attribute in descending order of click-through rates to obtain a first message queue (b2-a2), sorts the notification messages c2 and d2 without an ongoing attribute in descending order of click-through rates to obtain a second message queue (d2-c2), and arranges the first message queue in front of the second message queue to obtain a notification message queue. Specifically, as shown in FIG. 8, after the user opens the terminal to display the notification bar display interface of the terminal, the terminal displays the notification message queue in the notification bar display interface.

3. Sorting is Performed Based on a Time Point and a Click-Through Rate.

In this embodiment of this application, after the terminal determines the notification message with an ongoing attribute in the plurality of notification messages, the terminal extracts the notification message with an ongoing attribute; sorts notification messages with an ongoing attribute in descending order of click-through rates corresponding to notification types, to obtain a first message queue; and then sorts other notification messages without an ongoing attribute in ascending order of notification time points to obtain a second message queue. The notification message queue is a message queue that includes the first message queue and the second message queue, and the first message queue is arranged in front of the second message queue.

It should be understood that, in this embodiment of this application, a process of sorting the notification messages with an ongoing attribute in descending order of click-through rates corresponding to notification types to obtain the first message queue is similar to a process of sorting the notification messages with an ongoing attribute or the notification messages without an ongoing attribute in the foregoing manner 2. Details are not described herein again. A process of sorting the other notification messages without an ongoing attribute in ascending order of notification time points to obtain the second message queue is similar to a process of sorting the notification messages with an ongoing attribute or the notification messages without an ongoing attribute in the foregoing manner 1. Details are not described herein again.

It should be further understood that, in addition to the foregoing three manners, the terminal may arrange the notification message with an ongoing attribute in front of the another notification message without an ongoing attribute in another manner. For example, the terminal sorts notification messages with an ongoing attribute in ascending order of notification time points to obtain a first message queue, sorts notification messages without an ongoing attribute in descending order of click-through rates to obtain a second message queue, and then arranges the first message queue in front of the second message queue to obtain the notification message queue. This is not specifically limited in this embodiment of this application.

Figure 9:
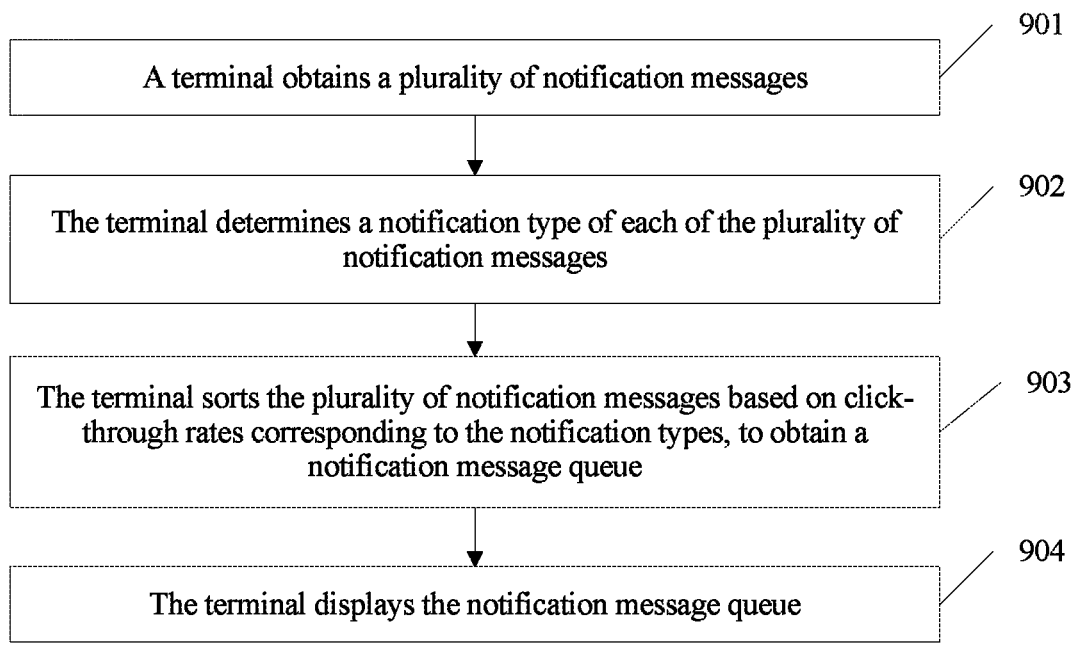
FIG. 9 is a flowchart of another embodiment of a message notification method according to an embodiment of this application.

An embodiment of this application further provides another message notification method. Referring to FIG. 9, another embodiment of the message notification method in this embodiment of this application includes the following steps.

901: A terminal obtains a plurality of notification messages.

In this embodiment of this application, a plurality of application clients are installed on the terminal. After the terminal is started, the terminal may trigger generation of a notification message based on a local application, for example, a to-do list reminder notification. Alternatively, the terminal may receive, by using an application client, a notification message sent by an application server, for example, an application update reminder. Alternatively, the terminal may obtain a notification message in another manner. This is not specifically limited herein.

After obtaining the notification message, the terminal may instantly display the notification message, to send a reminder to a user. As shown in FIG. 3, FIG. 3 is a schematic diagram in which the terminal displays an obtained notification message when the terminal is in a standby state. As shown in FIG. 4, FIG. 4 is a schematic diagram in which the terminal displays an obtained notification message when the terminal is in an active state. Alternatively, the terminal may instantly display an obtained notification message in another manner, or may not display an obtained notification message. This is not specifically limited herein.

In this case, in this embodiment of this application, the plurality of notification messages obtained by the terminal may include a notification message that is not displayed, a notification message that is displayed but is not viewed by the user, or a notification message that is viewed but is not processed by the user, and may further include another notification message that needs to be displayed in a message queue. This is not specifically limited herein.

902: The terminal determines a notification type of each of the plurality of notification messages.

After obtaining the notification message, the terminal may determine the notification type of the notification message.

Optionally, in this embodiment of this application, the terminal may determine the notification type of the notification message in the following several manners.

1. The Terminal Determines the Notification Type of the Notification Message Based on an Application Type of the Notification Message.

After obtaining the notification message, the terminal may use, as the notification type of the notification message, a type of an application to which the notification message belongs. Specifically, the type of the application to which the notification message belongs may be defined by the application server, may be user-defined, may be determined by the terminal based on application information of the application, or may be determined in another manner. This is not specifically limited herein.

2. The Terminal Determines the Notification Type of the Notification Message Based on a Message Type of the Notification Message.

After obtaining the notification message, the terminal may use the message type of the notification message as the notification type of the notification message. Specifically, the message type of the notification message may be defined by the application server, may be user-defined, may be determined by the terminal based on message content of the notification message, where the message type may be specifically determined based on a keyword in the notification message, or may be determined in another manner. This is not specifically limited herein.

3. The Terminal Determines the Notification Type of the Notification Message Based on an Application Type and a Message Type of the Notification Message.

After obtaining the notification message, the terminal determines the notification type of the notification message based on the application type corresponding to the notification message and the message type corresponding to the notification message.

Specifically, the terminal may preset a first weight corresponding to a type (the application type) of an application and a second weight corresponding to a type (the message type) of the message; then analyze a tendency degree of each type corresponding to the application to which the notification message belongs and a tendency degree of each type corresponding to message content of the notification message; then calculate, based on the first weight and the second weight, a weighted average corresponding to each type; and then use a type with a largest weighted average as the notification type of the notification message. For a specific calculation process, refer to the foregoing application scenario (3). Details are not described herein again.

It should be understood that, in addition to the foregoing several manners, the terminal may determine the notification type of the notification message in another manner. This is not specifically limited herein.

903: The terminal sorts the plurality of notification messages based on click-through rates corresponding to the notification types, to obtain a notification message queue.

After determining the notification types of the notification messages, the terminal may determine the click-through rates corresponding to the notification types, and then sort the plurality of notification messages based on the click-through rates, so that a notification message whose click-through rate is greater than a preset threshold is arranged in front of a notification message whose click-through rate is less than the preset threshold.

Optionally, in this embodiment of this application, the terminal may sort the plurality of notification messages in the following several manners.

1. Sorting is Performed Based on a Time Point.

After determining the click-through rates corresponding to the notification types of the notification messages, the terminal may sort, in ascending order of notification time points, notification messages whose click-through rates are greater than the preset threshold, to obtain a first message queue; and similarly, sort, in ascending order of notification time points, notification messages whose click-through rates are less than the preset threshold, to obtain a second message queue. The notification message queue is a message queue that includes the first message queue and the second message queue, and the first message queue is arranged in front of the second message queue.

It should be understood that, the notification time point in this embodiment of this application may be a time point at which the notification message is received, or may be a time point at which the notification message is sent.

2. Sorting is Performed Based on a Click-Through Rate.

After determining the click-through rates corresponding to the notification types of the notification messages, the terminal may sort the obtained plurality of notification messages in descending order of the click-through rates to obtain the message queue. Notification messages of a same notification type or notification messages with a same click-through rate may be sorted in ascending order of notification time points.

3. Sorting is Performed Based on a Time Point and a Click-Through Rate.

After determining the click-through rates corresponding to the notification types of the notification messages, the terminal may sort, in descending order of click-through rates, notification messages whose click-through rates are greater than the preset threshold, to obtain a first message queue; and sort, in ascending order of notification time points, notification messages whose click-through rates are less than the preset threshold, to obtain a second message queue. The notification message queue is a message queue that includes the first message queue and the second message queue, and the first message queue is arranged in front of the second message queue.

Alternatively, after determining the click-through rates corresponding to the notification types of the notification messages, the terminal may sort, in ascending order of notification time points, notification messages whose click-through rates are greater than the preset threshold, to obtain a first message queue; and sort, in descending order of click-through rates, notification messages whose click-through rates are less than the preset threshold, to obtain a second message queue. The notification message queue is a message queue that includes the first message queue and the second message queue, and the first message queue is arranged in front of the second message queue.

It should be understood that, in addition to the foregoing several manners, the terminal may sort the notification messages based on a characteristic such as an ongoing attribute of the notification message. This is not specifically limited in this embodiment of this application.

It should be further understood that, in this embodiment of this application, before sorting the notification messages, the terminal may obtain, through calculation based on a quantity of times of displaying a notification message of each notification type and a quantity of times of clicking the notification message of each notification type, a click-through rate corresponding to the notification message of each notification type. Specifically, the terminal may determine, through statistics collection, a quantity of times of displaying the notification message of each notification type within a preset time period, and a quantity of times of clicking the notification message of the notification type within the preset time period; and then divide, by the quantity of times of displaying the notification message, the quantity of times of clicking the notification message, to obtain the click-through rate corresponding to the notification message of the notification type.

904: The terminal displays the notification message queue.

Figure 10:
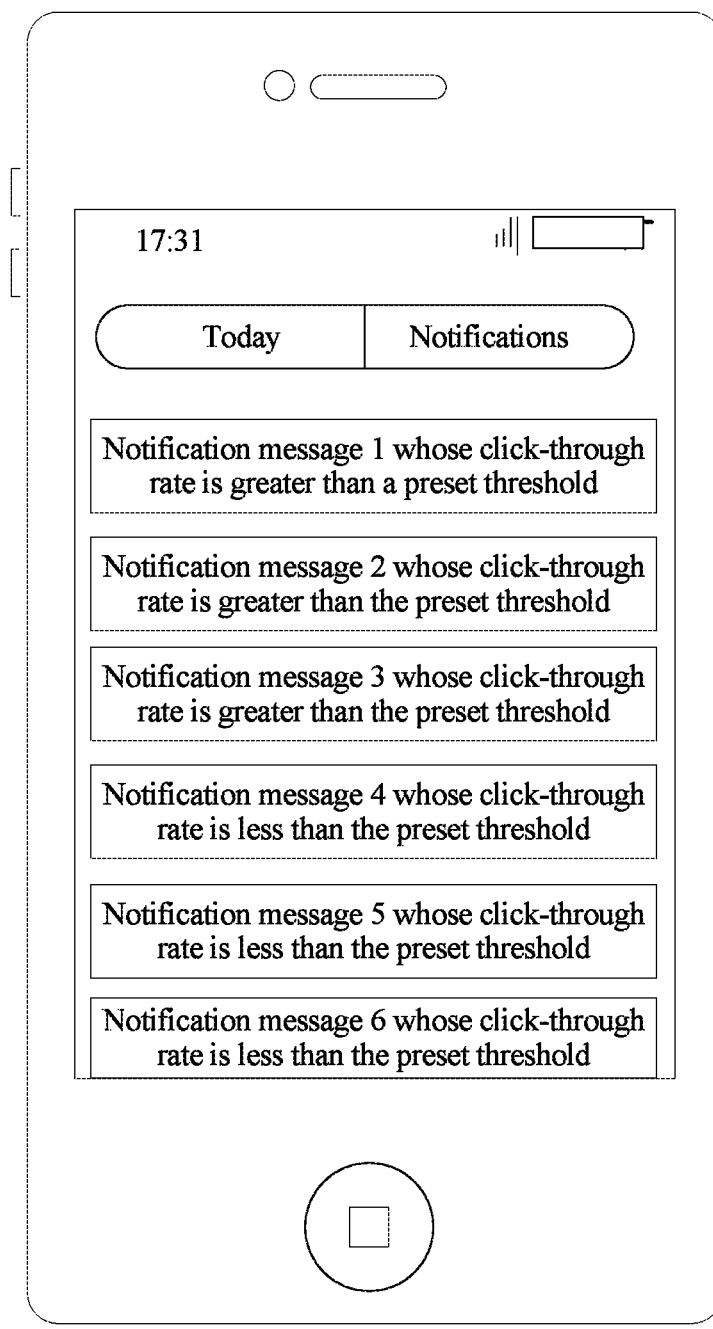
FIG. 10 is another schematic diagram of a notification message queue displayed on a terminal according to an embodiment of this application.
Figure 11:
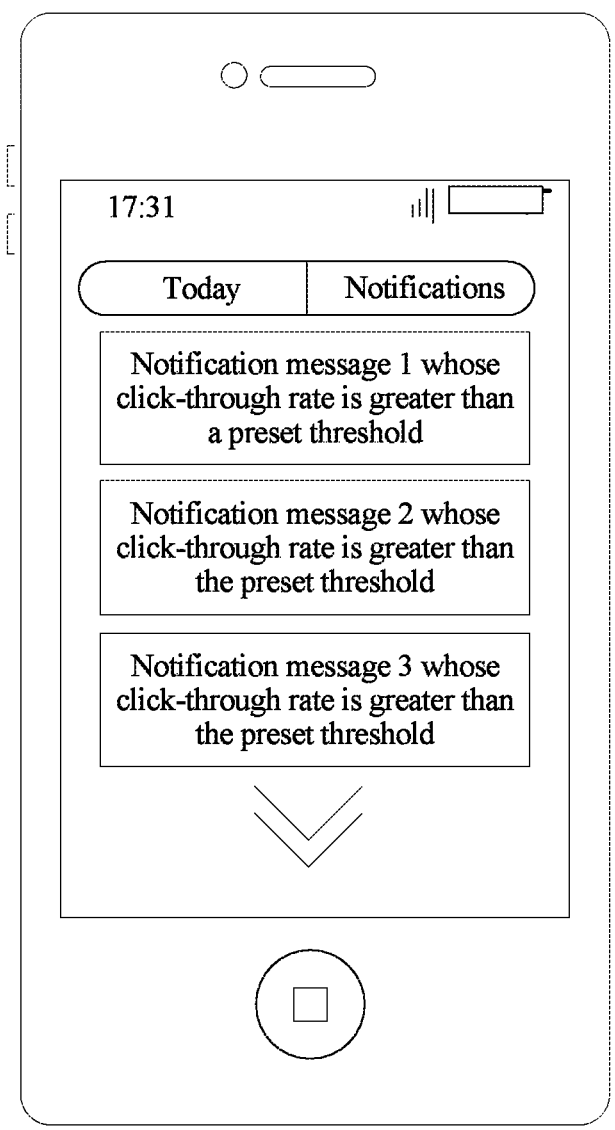
FIG. 11 is another schematic diagram of a notification message queue displayed on a terminal according to an embodiment of this application.

After sorting the plurality of notification messages to obtain the notification message queue, the terminal displays the notification message queue. Specifically, in this embodiment of this application, the terminal may display the notification messages in the notification message queue in the manner shown in FIG. 3, or may display the notification messages in the notification message queue in the manner shown in FIG. 4, or as shown in FIG. 10, may display the notification messages in the notification message queue in a centralized manner in a notification message queue display interface. It should be understood that in actual application, a manner of displaying the notification message queue in the notification message queue display interface is not limited to the manner in FIG. 10. For example, the terminal may display only one or more notification messages in the notification message queue, and thumbnail or hide another notification message. As shown in FIG. 11, the thumbnailed or hidden notification message is displayed only when a user-related operation instruction is received. It should be further understood that, in this embodiment of this application, the notification message queue display interface may be a notification bar display interface of the terminal, or may be another message display interface. This is not specifically limited herein.

Figure 12:
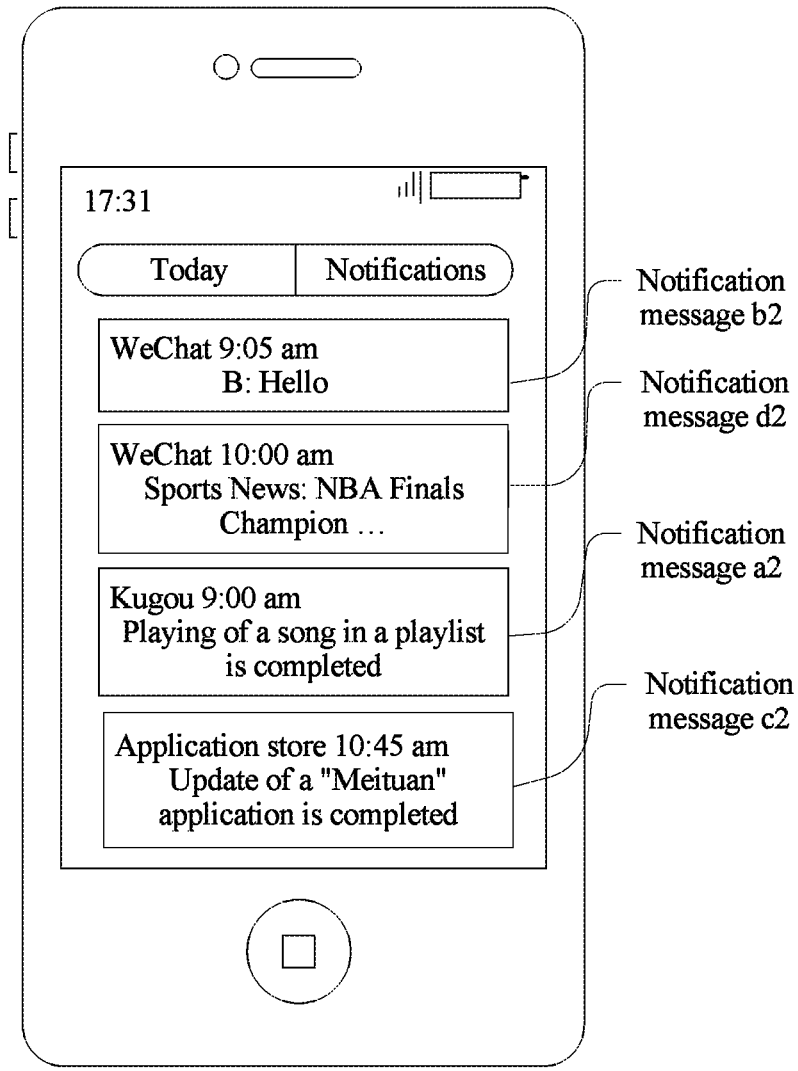
FIG. 12 is another schematic diagram of a notification message queue displayed on a terminal according to an embodiment of this application.

The following uses the foregoing application scenario (3) as an example. The terminal sorts the notification messages in the manner 1 described in step 903, and the preset threshold is 65%. In this case, after obtaining the notification messages a2, b2, c2, and d2, the terminal performs sorting in the manner 1 in step 903. To be specific, the terminal sorts, in an order of receiving time points, the notification messages b2 and d2 whose click-through rates are greater than 65%, to obtain a first message queue (b2-d2); sorts, in an order of receiving time points, the notification messages a2 and c2 whose click-through rates are less than 65%, to obtain a second message queue (a2-c2); and arranges the first message queue in front of the second message queue to obtain a notification message queue. In this case, the terminal may display the notification message queue (b2-d2-a2-c2) in a manner shown in FIG. 12.

Other sorting manners and corresponding display results are not enumerated herein.

In this embodiment of this application, after obtaining the plurality of notification messages, the terminal may determine the notification types of the notification messages, then sort the notification messages based on the click-through rates corresponding to the types, and display a sorting result. In other words, in this embodiment of this application, a notification type in which the user is relatively interested may be identified based on historical behavior of the user, and then the notification type in which the user is interested is arranged ahead, to facilitate viewing of the user and improve search efficiency.

In addition, in this embodiment of this application, the terminal may determine the notification type in a plurality of manners, and may further sort the notification messages in a plurality of manners, thereby improving flexibility of this solution.

Figure 13:
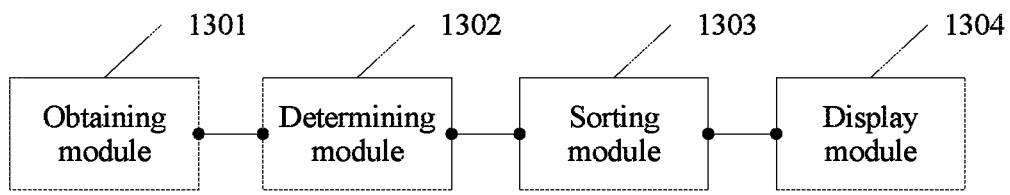
FIG. 13 is a schematic diagram of an embodiment of a terminal according to an embodiment of this application.

The foregoing describes the message notification method in the embodiments of this application. The following describes a terminal in an embodiment of this application. Referring to FIG. 13, an embodiment of the terminal in this embodiment of this application includes:

an obtaining module 1301, configured to obtain a plurality of notification messages;

a determining module 1302, configured to determine a notification message with an ongoing ongoing attribute in the plurality of notification messages obtained by the obtaining module 1301;

a sorting module 1303, configured to sort the plurality of notification messages to obtain a notification message queue, so that the notification message with an ongoing attribute is arranged in front of another notification message; and a display module 1304, configured to display the notification message queue.

In this embodiment of this application, after the obtaining module 1301 obtains the plurality of notification messages, the determining module 1302 may determine the notification message with an ongoing attribute in the plurality of notification messages, the sorting module 1303 arranges the notification message with an ongoing attribute in front of another message, and the display module 1304 displays a sorting result. The notification message with an ongoing attribute is a message that is sent by a server corresponding to an application program and that requires continuous attention of a user. Generally, the message that requires continuous attention of the user, such as information received by instant messaging software, is information to which the user pays more attention. Therefore, the notification message with an ongoing attribute is arranged ahead, to facilitate searching of important information by the user, and improve user experience.

Figure 14:
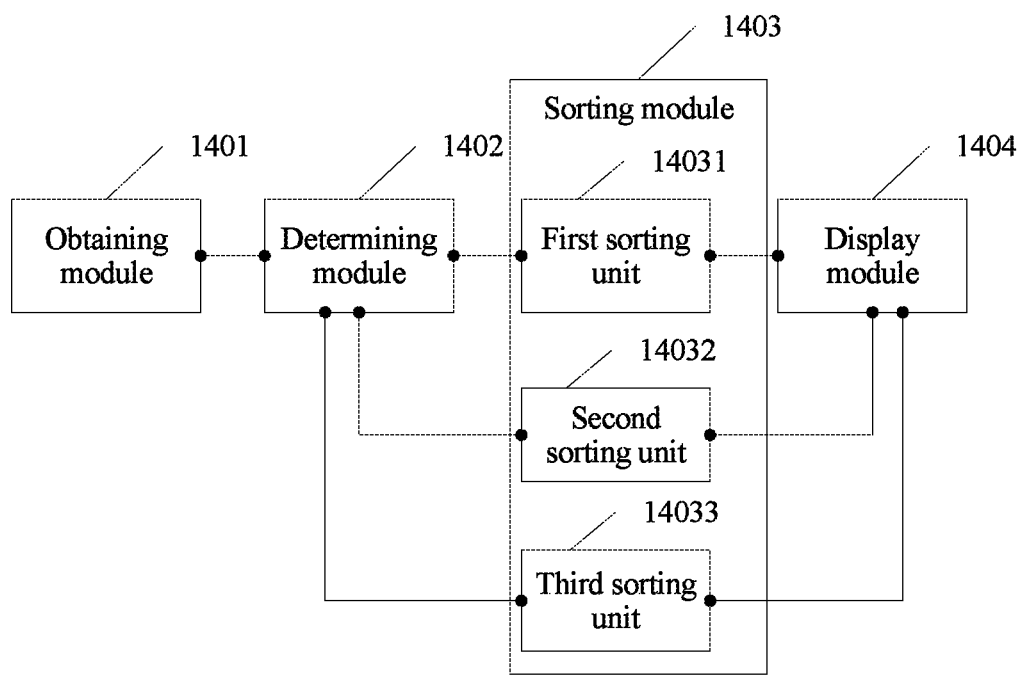
FIG. 14 is a schematic diagram of another embodiment of a terminal according to an embodiment of this application.

For ease of understanding, referring to FIG. 14, another embodiment of a terminal in an embodiment of this application includes:

an obtaining module 1401, configured to obtain a plurality of notification messages;

a determining module 1402, configured to determine a notification message with an ongoing ongoing attribute in the plurality of notification messages obtained by the obtaining module 1401;

a sorting module 1403, configured to sort the plurality of notification messages to obtain a notification message queue, so that the notification message with an ongoing attribute is arranged in front of another notification message; and a display module 1404, configured to display the notification message queue.

The sorting module 1403 may include:

a first sorting unit 14031, configured to: sort notification messages with an ongoing attribute in ascending order of notification time points to obtain a first message queue, and sort other notification messages in ascending order of notification time points to obtain a second message queue, where the notification message queue includes the first message queue and the second message queue, and the first message queue is arranged in front of the second message queue; or a second sorting unit 14032, configured to: sort notification messages with an ongoing attribute in descending order of click-through rates corresponding to notification types, to obtain a first message queue; and sort other notification messages in descending order of click-through rates corresponding to notification types, to obtain a second message queue, where the notification message queue includes the first message queue and the second message queue, and the first message queue is arranged in front of the second message queue; or a third sorting unit 14033, configured to: sort notification messages with an ongoing attribute in descending order of click-through rates corresponding to notification types, to obtain a first message queue; and sort other notification messages in ascending order of notification time points to obtain a second message queue, where the notification message queue includes the first message queue and the second message queue, and the first message queue is arranged in front of the second message queue.

It should be understood that, in the embodiment corresponding to FIG. 14, a procedure executed by each module of the terminal is similar to the method procedure described in the embodiment shown in FIG. 2, and details are not described herein again.

In this embodiment of this application, after the obtaining module 1401 obtains the plurality of notification messages, the determining module 1402 may determine the notification message with an ongoing attribute in the plurality of notification messages, the sorting module 1403 arranges the notification message with an ongoing attribute in front of another message, and the display module 1404 displays a sorting result. The notification message with an ongoing attribute is a message that is sent by a server corresponding to an application program and that requires continuous attention of a user. Generally, the message that requires continuous attention of the user, such as information received by instant messaging software, is information to which the user pays more attention. Therefore, the notification message with an ongoing attribute is arranged ahead, to facilitate searching of important information by the user, and improve user experience.

This embodiment of this application provides a plurality of manners in which the sorting module 1403 sorts the notification messages, thereby improving flexibility of this solution.

Figure 15:
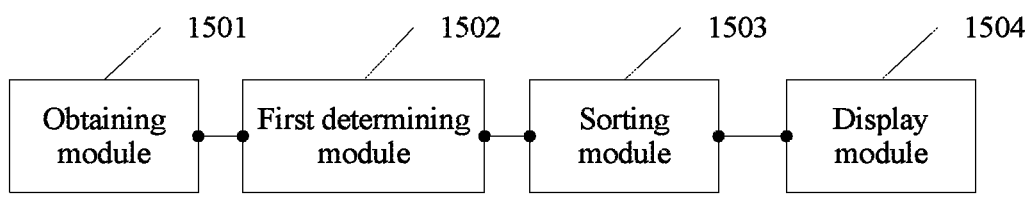
FIG. 15 is a schematic diagram of another embodiment of a terminal according to an embodiment of this application.

Referring to FIG. 15, another embodiment of a terminal in an embodiment of this application includes:

an obtaining module 1501, configured to obtain a plurality of notification messages;

a first determining module 1502, configured to determine a notification type of each of the plurality of notification messages obtained by the obtaining module 1501;

a sorting module 1503, configured to sort the plurality of notification messages based on click-through rates corresponding to the notification types determined by the first determining module 1502, to obtain a notification message queue; and a display module 1504, configured to display the notification message queue.

In this embodiment of this application, after the obtaining module 1501 obtains the plurality of notification messages, the first determining module 1502 may determine the notification types of the notification messages, then the sorting module 1503 sorts the notification messages based on the click-through rates corresponding to the types, and the display module 1504 displays a sorting result. In other words, in this embodiment of this application, a notification type in which a user is relatively interested may be identified based on historical behavior of the user, and then the notification type in which the user is interested is arranged ahead, to facilitate viewing of the user and improve search efficiency.

Figure 16:
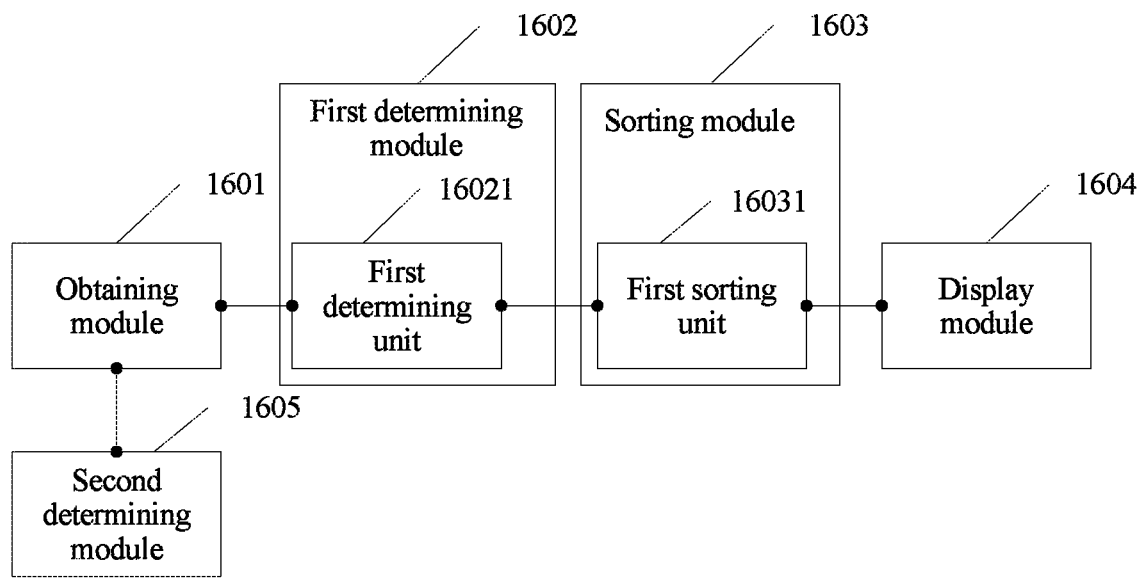
FIG. 16 is a schematic diagram of another embodiment of a terminal according to an embodiment of this application.

For ease of understanding, referring to FIG. 16, another embodiment of a terminal in an embodiment of this application includes:

an obtaining module 1601, configured to obtain a plurality of notification messages;

a first determining module 1602, configured to determine a notification type of each of the plurality of notification messages obtained by the obtaining module 1601;

a sorting module 1603, configured to sort the plurality of notification messages based on click-through rates corresponding to the notification types determined by the first determining module 1602, to obtain a notification message queue; and a display module 1604, configured to display the notification message queue.

Optionally, in this embodiment of this application, the sorting module 1603 may include:

a sorting unit 16031, configured to: sort, in ascending order of notification time points, notification messages whose click-through rates are greater than a preset threshold, to obtain a first message queue; and sort, for the terminal in ascending order of notification time points, notification messages whose click-through rates are less than the preset threshold, to obtain a second message queue, where the notification message queue includes the first message queue and the second message queue, and the first message queue is arranged in front of the second message queue.

Optionally, in this embodiment of this application, the terminal may further include:

a second determining module 1605, configured to determine, based on a notification message displayed within a preset time period and a notification message clicked by a user within the preset time period, a click-through rate corresponding to each notification type.

Optionally, in this embodiment, the first determining module 1602 may include:

a first determining unit 16021, configured to determine the notification type of each notification message based on an application type corresponding to the notification message and a message type corresponding to the notification message, where the application type is a type of an application to which the notification message belongs, and the message type is a type of the notification message.

It should be understood that, in the embodiment corresponding to FIG. 16, a procedure executed by each module of the terminal is similar to the method procedure described in the embodiment shown in FIG. 9, and details are not described herein again.

In this embodiment of this application, after the obtaining module 1601 obtains the plurality of notification messages, the first determining module 1602 may determine the notification types of the notification messages, then the sorting module 1603 sorts the notification messages based on the click-through rates corresponding to the types, and the display module 1604 displays a sorting result. In other words, in this embodiment of this application, a notification type in which the user is relatively interested may be identified based on historical behavior of the user, and then the notification type in which the user is interested is arranged ahead, to facilitate viewing of the user and improve search efficiency.

In addition, in this embodiment of this application, the terminal may improve feasibility of this solution by using a specific manner of determining the notification type and a specific sorting manner.

Figure 17:
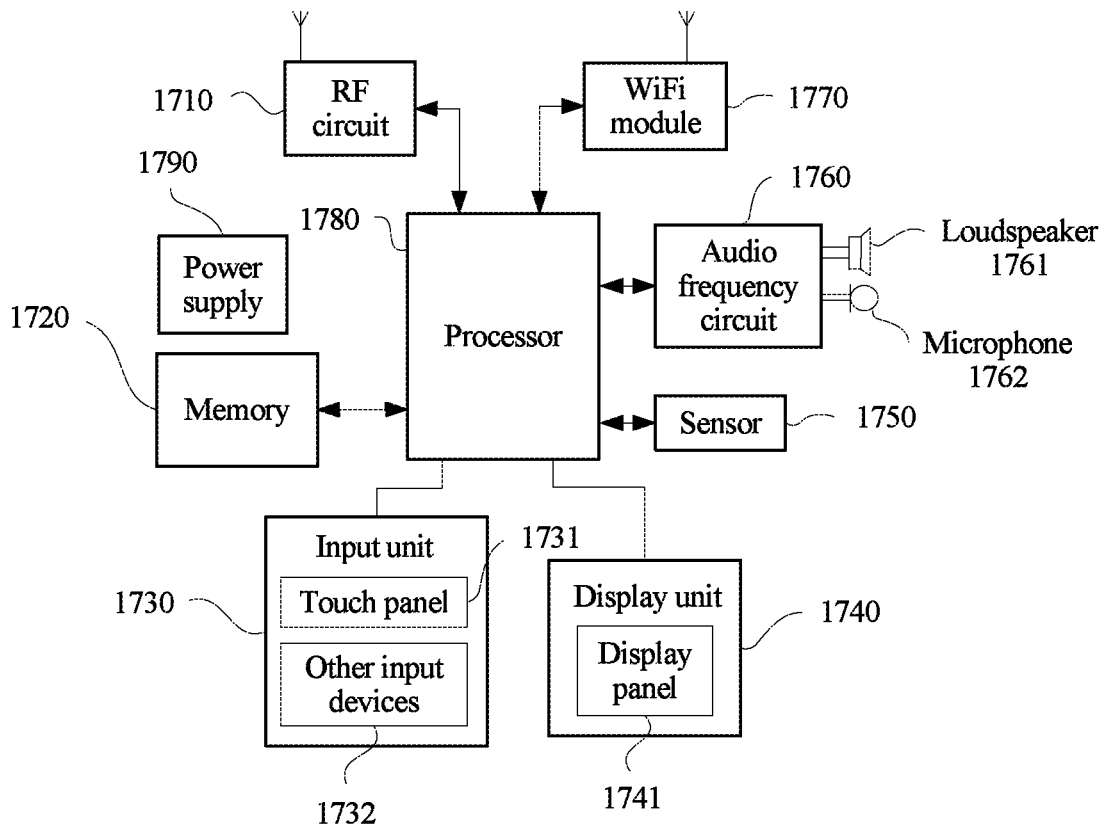
FIG. 17 is a schematic diagram of another embodiment of a terminal according to an embodiment of this application.

The foregoing describes the terminal in the embodiments of this application from a perspective of a function module. The following describes a terminal in an embodiment of this application from a perspective of physical hardware. As shown in FIG. 17, for ease of description, only a part related to this embodiment of this application is shown. For specific technical details that are not disclosed, refer to the method part in the embodiments of this application. The terminal may be any terminal device, including a mobile phone, a tablet computer, a personal digital assistant (Personal Digital Assistant, PDA for short), a point of sale (Point of Sale, POS for short), an in-vehicle computer, or the like. For example, the terminal is a mobile phone.

FIG. 17 is a block diagram of a partial structure of a mobile phone related to the terminal according to this embodiment of this application. Referring to FIG. 17, the mobile phone includes components such as a radio frequency (Radio Frequency, RF for short) circuit 1710, a memory 1720, an input unit 1730, a display unit 1740, a sensor 1750, an audio frequency circuit 1760, a Wireless Fidelity (wireless fidelity, WiFi for short) module 1770, a processor 1780, and a power supply 1790. Persons skilled in the art may understand that, the structure of the mobile phone shown in FIG. 17 does not constitute a limitation on the mobile phone, and the mobile phone may include more or fewer components than those shown in the figure, or combine some components, or have different component arrangements.

The following describes all components of the mobile phone in detail with reference to FIG. 17.

The RF circuit 1710 may be configured to: receive and send information, or receive and send a signal during a call. Particularly, after receiving downlink information from a base station, the RF circuit 1710 sends the downlink information to the processor 1780 for processing, and sends uplink data to the base station. Generally, the RF circuit 1710 includes but is not limited to an antenna, at least one amplifier, a transceiver, a coupler, a low noise amplifier (Low Noise Amplifier, LNA for short), and a duplexer. In addition, the RF circuit 1710 may communicate with a network and another device through wireless communication. Any communications standard or protocol may be used for the wireless communication, including but not limited to a Global System for Mobile Communications (Global System for Mobile communication, GSM for short), a general packet radio service (General Packet Radio Service, GPRS), Code Division Multiple Access (Code Division Multiple Access, CDMA for short), Wideband Code Division Multiple Access (Wideband Code Division Multiple Access, WCDMA for short), Long Term Evolution (Long Term Evolution, LTE for short), an email, and a short message service (Short Message Service, SMS).

The memory 1720 may be configured to store a software program and a module. The processor 1780 performs various function applications of the mobile phone and data processing by running the software program and the module that are stored in the memory 1720. The memory 1720 may mainly include a program storage area and a data storage area. The program storage area may store an operating system, an application program required by at least one function (such as a sound play function or an image play function), and the like. The data storage area may store data (such as audio data or a phone book) created based on use of the mobile phone, and the like. In addition, the memory 1720 may include a high-speed random access memory, and may further include a non-volatile memory, such as at least one magnetic disk storage device, a flash memory device, or another volatile solid-state storage device.

The input unit 1730 may be configured to: receive entered digital or character information, and generate key signal input related to user settings and function control of the mobile phone. Specifically, the input unit 1730 may include a touch panel 1731 and other input devices 1732. The touch panel 1731 is also referred to as a touchscreen, and may collect a touch operation (for example, an operation performed by a user on the touch panel 1731 or near the touch panel 1731 by using any proper object or accessory such as a finger or a stylus) of the user on or near the touch panel 1731, and drive a corresponding connection apparatus based on a preset program. Optionally, the touch panel 1731 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into coordinates of a touch point, sends the coordinates to the processor 1780, and can receive and execute a command sent by the processor 1780. In addition, the touch panel 1731 may be implemented by using a plurality of types such as a resistive type, a capacitive type, an infrared ray type, and a surface acoustic wave type. In addition to the touch panel 1731, the input unit 1730 may include other input devices 1732. Specifically, the other input devices 1732 may include but are not limited to one or more of a physical keyboard, a function key (such as a volume control key or an on/off key), a trackball, a mouse, and a joystick.

The display unit 1740 may be configured to display information entered by the user or information provided for the user, and various menus of the mobile phone. The display unit 1740 may include a display panel 1741. Optionally, the display panel 1741 may be configured in a form of a liquid crystal display (Liquid Crystal Display, LCD for short), an organic light-emitting diode (Organic Light-Emitting Diode, OLED for short), or the like. Further, the touch panel 1731 may cover the display panel 1741. After detecting the touch operation on or near the touch panel 1731, the touch panel 1731 transfers the touch operation to the processor 1780 to determine a type of a touch event. Then, the processor 1780 provides corresponding visual output on the display panel 1741 based on the type of the touch event. Although the touch panel 1731 and the display panel 1741 in FIG. 17 are used as two independent components to implement input and output functions of the mobile phone, in some embodiments, the touch panel 1731 and the display panel 1741 may be integrated to implement the input and output functions of the mobile phone.

The mobile phone may further include at least one type of sensor 1750, such as a light sensor, a motion sensor, and another sensor. Specifically, the light sensor may include an ambient light sensor and a proximity sensor. The ambient light sensor may adjust luminance of the display panel 1741 based on brightness of ambient light. The proximity sensor may turn off the display panel 1741 and/or backlight when the mobile phone moves to an ear of the user. As a type of motion sensor, an accelerometer sensor may detect a value of an acceleration in each direction (generally, three axes), may detect a value and a direction of gravity in a static state, and may be used in an application for identifying a mobile phone posture (such as screen switching between landscape and portrait modes, a related game, or magnetometer posture calibration), a function related to vibration identification (such as a pedometer or a knock), and the like. Other sensors such as a gyroscope, a barometer, a hygrometer, a thermometer, and an infrared sensor may be further disposed on the mobile phone. Details are not described herein.

The audio frequency circuit 1760, a loudspeaker 1761, and a microphone 1762 may provide an audio interface between the user and the mobile phone. The audio frequency circuit 1760 may convert received audio data into an electrical signal, and transmit the electrical signal to the loudspeaker 1761, and the loudspeaker 1761 converts the electrical signal into a sound signal for output. In addition, the microphone 1762 converts a collected sound signal into an electrical signal, and the audio frequency circuit 1760 receives the electrical signal, converts the electrical signal into audio data, and outputs the audio data to the processor 1780 for processing. Then, the audio data is sent to, for example, another mobile phone, by using the RF circuit 1710, or the audio data is output to the memory 1720 for further processing.

WiFi is a short-range wireless transmission technology. The mobile phone may help, by using the WiFi module 1770, the user receive and send an email, browse a web page, access streaming media, and the like. The WiFi module 1770 provides wireless broadband Internet access for the user. Although the WiFi module 1770 is shown in FIG. 17, it may be understood that the WiFi module 1770 is not a mandatory component of the mobile phone, and may be omitted as required without changing the essence of the present invention.

The processor 1780 is a control center of the mobile phone, and uses various interfaces and lines to connect all parts of the entire mobile phone, and performs various functions of the mobile phone and data processing by running or executing the software program and/or the module that are/is stored in the memory 1720 and by invoking data stored in the memory 1720, to perform overall monitoring on the mobile phone. Optionally, the processor 1780 may include one or more processing units. Optionally, an application processor and a modem processor may be integrated into the processor 1780. The application processor mainly processes an operating system, a user interface, an application program, and the like. The modem processor mainly processes wireless communication. It may be understood that, the modem processor may not be integrated into the processor 1780.

The mobile phone further includes the power supply 1790 (such as a battery) that supplies power to each component. Preferably, the power supply may be logically connected to the processor 1780 by using a power supply management system, to implement functions such as charging management, discharging management, and power consumption management by using the power supply management system.

Although not shown, the mobile phone may further include a camera, a Bluetooth module, and the like. Details are not described herein.

In another embodiment of the terminal provided in this application, the processor 1780 included in the terminal is configured to perform the following steps:

obtaining a plurality of notification messages;

determining a notification message with an ongoing ongoing attribute in the plurality of notification messages;

sorting the plurality of notification messages to obtain a notification message queue, so that the notification message with an ongoing attribute is arranged in front of another notification message; and displaying the notification message queue.

Optionally, in this embodiment of this application, the processor 1780 may further have the following function:

sorting notification messages with an ongoing attribute in ascending order of notification time points to obtain a first message queue, and sorting other notification messages in ascending order of notification time points to obtain a second message queue, where the notification message queue includes the first message queue and the second message queue, and the first message queue is arranged in front of the second message queue.

Optionally, the processor 1780 may further have the following function:

sorting notification messages with an ongoing attribute in descending order of click-through rates corresponding to notification types, to obtain a first message queue; and sorting other notification messages in descending order of click-through rates corresponding to notification types, to obtain a second message queue, where the notification message queue includes the first message queue and the second message queue, and the first message queue is arranged in front of the second message queue.

Optionally, the processor 1780 may further have the following function:

sorting notification messages with an ongoing attribute in descending order of click-through rates corresponding to notification types, to obtain a first message queue; and sorting other notification messages in ascending order of notification time points to obtain a second message queue, where the notification message queue includes the first message queue and the second message queue, and the first message queue is arranged in front of the second message queue.

In another embodiment of the terminal provided in this application, the processor 1780 included in the terminal is configured to perform the following steps:

obtaining a plurality of notification messages;

determining a notification type of each of the plurality of notification messages;

sorting the plurality of notification messages based on click-through rates corresponding to the notification types, to obtain a notification message queue; and displaying the notification message queue.

Optionally, in this embodiment of this application, the processor 1780 may specifically perform the following step:

sorting, in ascending order of notification time points, notification messages whose click-through rates are greater than a preset threshold, to obtain a first message queue; and sorting, by the terminal in ascending order of notification time points, notification messages whose click-through rates are less than the preset threshold, to obtain a second message queue, where the notification message queue includes the first message queue and the second message queue, and the first message queue is arranged in front of the second message queue.

Optionally, in this embodiment of this application, the processor 1780 is further configured to perform the following step:

determining, based on a notification message displayed within a preset time period and a notification message clicked by a user within the preset time period, a click-through rate corresponding to each notification type.

Optionally, in this embodiment of this application, the processor 1780 is specifically configured to perform the following step:

determining the notification type of each notification message based on an application type corresponding to the notification message and a message type corresponding to the notification message, where the application type is a type of an application to which the notification message belongs, and the message type is a type of the notification message.

An embodiment of this application further provides a computer storage medium. The computer storage medium is configured to store a computer software instruction used by the terminal, and the computer software instruction includes a program designed for the terminal.

An embodiment of this application further provides a computer program product. The computer program product includes a computer software instruction, and the computer software instruction may be loaded by using a processor to implement a procedure of the message notification method in any one of FIG. 1 to FIG. 9.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of this application.

What is claimed is:

1. A message notification method implemented by a terminal, the method comprising:
   determining, based on notification messages displayed within a preset time period and notification messages clicked by a user within the preset time period, click-through rates corresponding to a plurality of notification types, wherein each of the click-through rates corresponds to a ratio of a quantity of times of clicking a corresponding type of a notification message to a quantity of times of displaying the notification message;
   obtaining a plurality of first notification messages;
   determining first notification types of the first notification messages;
   sorting the first notification messages based on first click-through rates corresponding to the first notification types to obtain a notification message queue by:
      sorting, in ascending order of notification time points, second notification messages of the first notification messages whose click-through rates are greater than a preset threshold to obtain a first message queue; and
      sorting, in the ascending order of the notification time points, third notification messages of the first notification messages whose click-through rates are less than the preset threshold to obtain a second message queue, wherein the notification message queue comprises the first message queue and the second message queue, and wherein the first message queue is arranged in front of the second message queue; and
   displaying the notification message queue.

2. The method of claim 1, wherein determining the first notification types of the first notification messages comprises determining, for each notification message of the first notification messages, a notification type of the notification message based on an application type corresponding to the notification message and a message type corresponding to the notification message, wherein the application type is a type of an application to which the notification message belongs, and wherein the message type is a type of the notification message.

3. A terminal, comprising:
a processor;
an input device coupled to the processor;
an output device coupled to the processor; and
a memory coupled to the processor and configured to store a program that, when executed by the processor, causes the terminal to be configured to:
determine, based on notification messages displayed within a preset time period and notification messages clicked by a user within the preset time period, click-through rates corresponding to a plurality of notification types, wherein each of the click-through rates corresponds to a ratio of a quantity of times of clicking a corresponding type of a notification message to a quantity of times of displaying the notification message;
obtain, using the input device, a plurality of first notification messages;
determine first notification types of the first notification messages;
sort the first notification messages based on first click-through rates corresponding to the first notification types to obtain a notification message queue by:
sorting, in ascending order of notification time points, second notification messages of the first notification messages whose click-through rates are greater than a preset threshold to obtain a first message queue; and
sorting, in the ascending order of the notification time points, third notification messages of the first notification messages whose click-through rates are less than the preset threshold to obtain a second message queue, wherein the notification message queue comprises the first message queue and the second message queue, and wherein the first message queue is arranged in front of the second message queue; and
display, using the output device, the notification message queue.

4. A computer program product comprising computer-executable instructions for storage on a non-transitory computer-readable storage medium that, when executed by a processor, cause the processor to be configured to:
determine, based on notification messages displayed within a preset time period and notification messages clicked by a user within the preset time period, click-through rates corresponding to a plurality of notification types, wherein each of the click-through rates corresponds to a ratio of a quantity of times of clicking a corresponding type of a notification message to a quantity of times of displaying the notification message;
obtain a plurality of first notification messages;
determine first notification types of the first notification messages;
sort the first notification messages based on first click-through rates corresponding to the first notification types to obtain a notification message queue by
sorting, in ascending order of notification time points, second notification messages of the first notification messages whose click-through rates are greater than a preset threshold to obtain a first message queue; and
sorting, in the ascending order of the notification time points, third notification messages of the first notification messages whose click-through rates are less than the preset threshold to obtain a second message queue, wherein the notification message queue comprises the first message queue and the second message queue, and wherein the first message queue is arranged in front of the second message queue; and
display the notification message queue.

5. The terminal of claim 3, wherein when determining the first notification types of the first notification messages, the program further causes the terminal to be configured to determine, for each notification message of the first notification messages, a notification type of the notification message based on an application type corresponding to the notification message and a message type corresponding to the notification message, wherein the application type is a type of an application to which the notification message belongs, and wherein the message type is a type of the notification message.

6. The computer program product of claim 4, wherein when determining the first notification types of the first notification messages, the instructions further cause the processor to be configured to determine, for each notification message of the first notification messages, a notification type of the notification message based on an application type corresponding to the notification message and a message type corresponding to the notification message, wherein the application type is a type of an application to which the notification message belongs, and wherein the message type is a type of the notification message.

* * * * *